US009514861B2

(12) United States Patent
Efraimsson et al.

(10) Patent No.: US 9,514,861 B2
(45) Date of Patent: Dec. 6, 2016

(54) SELF-SUPPORTING CABLE AND COMBINATION COMPRISING A SUSPENSION ARRANGEMENT AND SUCH SELF-SUPPORTING CABLE

(71) Applicant: NKT CABLES GROUP A/S, Brondby (DK)

(72) Inventors: Lars Efraimsson, Falun (SE); Bengt Strom, Falun (SE)

(73) Assignee: NKT CABLES GROUP A/S, Brondby (DK)

( * ) Notice: Subject to any disclaimer, the term of this patent is extended or adjusted under 35 U.S.C. 154(b) by 0 days.

(21) Appl. No.: 14/647,299

(22) PCT Filed: Nov. 25, 2013

(86) PCT No.: PCT/EP2013/074646

§ 371 (c)(1),
(2) Date: May 26, 2015

(87) PCT Pub. No.: WO2014/080019

PCT Pub. Date: May 30, 2014

(65) Prior Publication Data

US 2015/0302953 A1 Oct. 22, 2015

Related U.S. Application Data

(63) Continuation of application No. PCT/SE2012/051297, filed on Nov. 23, 2012.

(51) Int. Cl.

*H02G 15/02* (2006.01)
*H02G 15/08* (2006.01)

(Continued)

(52) U.S. Cl.

CPC ............ *H01B 9/008* (2013.01); *H01B 7/0225* (2013.01); *H01B 7/184* (2013.01); *H01B 7/188* (2013.01); *H01B 7/1875* (2013.01); *H01B 9/006* (2013.01)

(58) Field of Classification Search

CPC ........... H01B 7/18; H01B 7/189; H01B 7/225; H01B 9/008; H02G 7/056

(Continued)

(56) References Cited

U.S. PATENT DOCUMENTS 2,761,273 A * 9/1956 Peterson ................ D07B 1/185 174/79
2,888,726 A * 6/1959 Smith, Sr. .............. H02G 7/056 174/79

(Continued)

FOREIGN PATENT DOCUMENTS

WO WO 2012/005638 A1 1/2012
WO WO 2012/005641 A1 1/2012

OTHER PUBLICATIONS

International Search Report (PCT/ISA/210) mailed on Jan. 3, 2014, by the European Patent Office as the International Searching Authority for International Application No. PCT/EP2013/074646.

(Continued)

*Primary Examiner* — Chau N Nguyen
*Assistant Examiner* — Roshn Varghese
(74) *Attorney, Agent, or Firm* — Buchanan Ingersoll & Rooney PC

(57) ABSTRACT

A self-supporting cable including an outer portion and an inner portion is provided, as well as a combination of a self-supporting cable and a suspension arrangement. The inner portion includes at least one insulated conductor and the outer portion includes a first inner surface and an external surface. The external surface is arranged to engage with a suspension arrangement. The inner portion includes a first outer surface, the first outer surface abutting against the first inner surface. The outer portion includes an outer layer and a metal tape adhered to the outer layer. The outer layer includes the external surface, and the metal tape includes the first inner surface. The first inner surface being of metal and adapted for, during local load, frictional engagement with the material of the first outer surface increases the effectiveness of a functional grip between first outer surface and first inner surface.

25 Claims, 6 Drawing Sheets

(51) Int. Cl.

| | |
|---|---|
| ***H01B 7/18*** | (2006.01) |
| ***H01B 9/02*** | (2006.01) |
| ***H01B 9/00*** | (2006.01) |
| ***H01B 7/02*** | (2006.01) |

(58) Field of Classification Search
USPC .......................... 174/79, 104, 106 R, 120 SC
See application file for complete search history.

(56) References Cited

U.S. PATENT DOCUMENTS

| | | | | | |
|---|---|---|---|---|---|
| 3,643,007 | A * | 2/1972 | Roberts | H01B 11/1808 174/106 R |
| 4,398,058 | A * | 8/1983 | Gerth | H01B 7/2825 174/102 D |
| 5,095,176 | A * | 3/1992 | Harbrecht | G02B 6/4422 174/107 |
| 5,758,005 | A * | 5/1998 | Yoshida | G02B 6/4416 174/40 R |
| 6,288,339 | B1 | 9/2001 | Efraimsson et al. | |
| 7,053,309 | B2 * | 5/2006 | Efraimsson | H01B 7/288 174/102 SC |
| 7,191,496 | B2 * | 3/2007 | Olenik | H02G 7/056 174/73.1 |
| 2010/0122844 | A1 * | 5/2010 | Efraimsson | G02B 6/4422 174/70 C |
| 2010/0186988 | A1 * | 7/2010 | Jeroense | H01B 7/045 174/103 |
| 2013/0180753 | A1 | 7/2013 | Johnsen et al. | |
| 2013/0213687 | A1 | 8/2013 | Johnsen et al. | |

OTHER PUBLICATIONS

Written Opinion (PCT/ISA/237) mailed on Jan. 3, 2014, by the European Patent Office as the International Searching Authority for International Application No. PCT/EP2013/074646.

* cited by examiner

SELF-SUPPORTING CABLE AND COMBINATION COMPRISING A SUSPENSION ARRANGEMENT AND SUCH SELF-SUPPORTING CABLE

TECHNICAL FIELD

The technical field relates to a self-supporting cable and to a combination comprising a suspension arrangement and such self-supporting cable.

BACKGROUND

A cable, such as an electric cable comprising at least one electrical conductor, has to be bendable to be wound in coils onto a cable drum, e.g. after manufacturing and for transporting the cable to an installation site. When suspended between suspension points, due to gravity acting on the cable, the cable will bend at, and between, the suspension points. To permit this bending or flexing of the cable, a relative movement between an outer portion and an inner portion of the cable in the longitudinal directions is allowed. For some cable types the relative movement between the inner and outer portions may be in the order of magnitude of 0-10 mm, or even larger in certain regions along the cable.

A self-supporting cable is designed to support forces related to its own weight and preferably also external forces affecting the self-supporting cable, such as wind and falling trees. At least one conductor in an inner portion of the self-supporting cable or at least one messenger wire in the inner portion of the self-supporting cable is designed to bear these forces. A conductor may comprise one or several wires that are made out of aluminium and/or copper. One solution is therefore to let the conductor itself act as the supporting element. At a suspension point of a self-supporting cable, forces acting on the self-supporting cable are transferred via a suspension arrangement to a carrying structure for the self-supporting cable, typically some kind of pole. Various kinds of suspension arrangements are known. Some kinds of suspension arrangements engage with an exterior surface of the self-supporting cable and thus, the forces have to be transferred between an outer portion comprising the exterior surface and the inner portion of the self-supporting cable.

WO 2012/005638 discloses a self-supporting cable comprising an intermediate layer arranged between an outer portion and an inner portion of the self-supporting cable. Relative movement between the inner and outer portions is permitted. At a suspension point, where the self-supporting cable is subjected to radial forces from a suspension arrangement, the intermediate layer provides a frictional engagement between the inner and outer portions, by means of which forces acting along the self-supporting cable may be transferred between the inner and outer portions.

WO 2012/005641 discloses a similar self-supporting cable as WO 2012/005638.

U.S. Pat. No. 6,288,339 discloses a self-supporting cable comprising an outer jacket, an insulated conductor, and arranged therebetween attached, a shield band. An inner surface of the jacket, the shield band, as well as an outer surface of the insulated conductor is provided with undulations. This solution has the effect that the layers can slip relative to each other to some extent when the cable is bent.

When, in response to inwardly directed radial forces, such as applied from a suspension arrangement provided at suspension ends of the cable in the form of a spiral extending around and along a portion of the outer jacket of the cable of U.S. Pat. No. 6,288,339, the undulated layers cam into each other whereby slippage between the outer jacket and the insulated conductor is avoided. However, the undulations, in particular on the inner side of the jacket, may rupture under high load. This may in particular occur during high ambient temperature conditions, such as around 50° C. or above. As undulations start to rupture in such a high load region of the self-supporting cable, the loading force may be transferred to adjacent undulations, which adjacent undulations in turn may rupture. The grip between the outer jacket and the shield band is lost in the portions or regions of the cable where the undulations have ruptured. Eventually, an undesirable slippage between the outer jacket and the inner insulated conductor may occur. Such slippage could lead to the entire outer jacket rupturing and the suspension arrangement in the form of a spiral to unwind from the outer jacket of the self-supporting cable.

SUMMARY

An object of embodiments disclosed herein is to provide an alternative self-supporting cable and a combination of said cable and a suspension arrangement in which forces may better be transferred between outer and inner portions of the self-supporting cable as well as provide an improved cable resilience against high loads in at least some regions of the self-supporting cable, such as at least the suspension ends of the self-supporting cable.

According to an aspect, the object is achieved by a self-supporting cable comprising an outer portion and an inner portion. The inner portion comprises at least one insulated conductor. The outer portion comprises a first inner surface and an external surface, the external surface being arranged to engage with a suspension arrangement. The inner portion comprises a first outer surface, the first outer surface abutting against the first inner surface. The outer portion comprises an outer layer and a metal tape adhered to the outer layer. The outer layer comprises the external surface and the metal tape comprises the first inner surface.

Since the outer portion comprises the metal tape which in turn comprises the first inner surface, basis for an advantageous frictional engagement with the first outer surface, i.e. between the outer and inner portions of the self-supporting cable, is provided. The first inner surface being of metal and adapted for, during local load, frictional engagement with the material of the first outer surface increases the effectiveness of a functional grip between first outer surface and first inner surface. Thus, an increased friction, in fact a frictional engagement may be achieved, when a radially inwardly directed force, e.g. from an externally provided suspension arrangement, is applied on the self-supporting cable. Thus, the metal tape first inner surface of the outer portion “bites into” the first outer surface of the inner portion, reaching short termed coefficients of friction (both kinetic as well as static) in the order of around 0.8 to around and up to 1.0. By specifically designing the self-suspending cable it can be adapted to, at a specific load or loads, enter into such frictional engagement. As a result, the above mentioned object is achieved.

Surprisingly, it has been discovered by the inventors, that a metal tape, even a flat, un-corrugated metal tape in some embodiments, being adhered to an inner side of an outer portion of a self-supporting cable and arranged adjacent to a first outer surface of an inner portion of the self-supporting cable may provide the sufficient friction needed between the outer and inner portions of the self-supporting cable—not only during normal load, but also when regions of or the entire self-supporting cable is subjected to relatively high load influences—to transfer longitudinal forces acting on the self-supporting cable between the outer portion and the inner portion at at least one of a suspension point, line, or region on or along the self-supporting cable. During high load forces, by applying an increased friction on this or these suspension point, line or region of the self-supporting cable, this may lead to a frictional engagement in these parts. During normal load conditions, by transferring the longitudinal forces acting on the self-supporting cable between the outer portion and the inner portion in the portions of the self-supporting cable further away from this point, line or region on or along the self-supporting cable, this may lead to a decreased friction in these and the other regions of the self-supporting cable.

Further, a high flexibility (bendability) of the self-supporting cable is maintained, which is in particular an important property when the self-supporting cable is being used e.g. as marine or aerial cables.

Upon closer investigation, it has been found that when the self-supporting cable is subjected to radially inwardly directed forces applied by a suspension arrangement at least partially enclosing the cable at a suspension point, line, or region, a longitudinal force, i.e. a force acting along a longitudinal direction of the cable, is transferred between the outer and inner portions by entering into a frictional engagement between the metal tape of the outer portion and the first outer surface of the inner portion. The frictional engagement and the longitudinal force cause the first inner surface and the metal tape to deform locally in many places underneath the suspension arrangement. In one particular advantageous embodiment they deform directly underneath where the suspension arrangement applies said radially inwardly directed force on at least one suspension point, line, or region along the self-supporting cable. However, each of the local deformations of the metal tape does not migrate to adjacent local deformations. Accordingly, the metal tape seen as a whole underneath the suspension arrangement advantageously does not rupture; and in the outer portion the longitudinal force is distributed evenly between the metal tape and the outer layer because the metal tape and outer layer advantageously are bonded together, in embodiments along the entire inner surface of the metal tape. Thus, transfer of the longitudinal force between the outer and inner portions is also distributed evenly over the portion of the self-supporting cable which is subjected to the radial forces, i.e. the portion of the cable underneath the suspension arrangement, advantageously only the parts directly under where the suspension arrangement contacts the outer layer. Moreover, the bending properties of the cable, in regions of the cable which are not subjected to radially inwardly directed forces, are sufficient, e.g. to allow a certain degree of longitudinal mutual movement of the inner and outer portion of the cable.

Another advantage is that the frictional abutment between the first inner surface and the first outer surface along the cable reduces vibrations and oscillations when the cable is subjected to strong winds.

The self-supporting cable, which in the following also is referred to as a cable, is designed to support forces related to its own weight such as gravitational pull and preferably also external forces affecting the self-supporting cable, such as wind, snow, ice, and falling trees. The forces, often locally occurring, tend to act along the self-supporting cable, i.e. in a longitudinal direction of the self-supporting cable. At least one conductor in the inner portion of the self-supporting cable and/or at least one messenger wire in the inner portion of the self-supporting cable may be designed to bear these longitudinal forces. At the suspension point, region or lines of the self-supporting cable, the longitudinal forces acting on the self-supporting cable are transferred via the suspension arrangement to a carrying structure for the self-supporting cable, for instance a carrying structure in the form of a pole or a wall for aerial applications, or a floating or suspended buoy for marine applications, or the edge of a drilled hole for mining applications, or one or more combinations thereof. Various kinds of suspension arrangements are known where some, such as e.g. a dead end spiral, engage with an exterior surface of the self-supporting cable. Thus, the longitudinal forces have to be transferred between an outer portion comprising the exterior surface and the inner portion of the self-supporting cable designed to bear the longitudinal forces. The suspension arrangement subjects the self-supporting cable to radial forces and thus, frictional forces between the outer and inner portions allow transfer of the longitudinal forces between the outer and inner portions of the self-supporting cable. In portions of the self-supporting cable which are not subjected to radial forces, a relative mutual longitudinal as well as concentric movement between the inner and outer portions is permitted, even encouraged in the self-supporting cable.

The self-supporting cable may be designed for different voltages for instance, for low voltage cables, up to 1 kV, and for high voltage cables, over 1 kV. The conductor itself may comprise one or more metal wires, typically made from aluminium and/or copper. The insulated conductor may comprise one or more insulating layers and semi-conducting layers around the conductor. For instance conductors designed for up to 1 kV may comprise only an insulating layer whereas a conductor for higher voltages may comprise insulating and semi-conducting layers.

According to embodiments, the metal tape may be continuous. This means that the laid metal tape extends along the entire length of provided cable, either being provided in sections, where each laid section contacts and follows the previously laid section, e.g. in contact or without contact to each other, or being wound from one singular long tape. This can be achieved e.g. by winding a metal tape, which has a longer tape length than tape width, such as at least 10 times longer than the tape width, helically around the inner portion with a certain pitch, or alternatively wrapping the metal tape along the entire length of the cable, i.e. the metal tape length approximates the cable part length, and its width approximates the circumference of the inner portion. Accordingly, the metal tape may be formed from a metal foil or a relatively thin metal sheet, which may extend around the inner circumference of the outer portion, preferably along the entire circumference thereof.

According to embodiments, a coefficient of friction between the first inner surface and the first outer surface may be at least 0.4. In this manner a frictional engagement between the first inner surface and the first outer surface sufficient for transferring a longitudinal force along the cable between the inner and outer portions of the cable may be provided, even enhanced, in regions of the cable being subjected to radially inwardly directed forces. A coefficient of friction between the first inner and first outer surfaces of at least 0.4 may for instance be achieved when the first outer surface comprises a metal or a rubberlike material. The friction between the first inner and first outer surfaces may include abrasive friction and/or adhesive friction. The coefficient of friction between the first inner surface and the first outer surface may vary as the first inner and first outer surfaces slide against each other—however, the coefficient of friction is at least 0.4. On cables subjected to high load and/or high ambient temperatures abrasive or adhesive friction may be preferable, to achieve a high friction. Higher coefficient of friction may be advantageous, such as at least 0.6, such as at least 0.7. The coefficients of friction being used herein are, when nothing else is mentioned, generally referring to the kinetic coefficient of friction. The static coefficient of friction is advantageously generally during low loads as low as possible between the two surfaces, preferably under 0.4, such as under 0.3.

According to embodiments, the first inner surface and/or the first outer surface may be provided with protrusions. In this manner further provisions for a frictional engagement between the first inner and the first outer surfaces may be provided.

According to embodiments, the metal tape may comprise a metal such as copper, aluminium, soft steel or zinc, or combinations thereof. In this manner further provisions for a frictional engagement between the first inner and the first outer surfaces may be provided.

According to embodiments, the first outer surface may be provided with depressions. In this manner further provisions for a frictional engagement between the first inner and the first outer surfaces may be provided.

According to embodiments, in a radially unloaded region of the self-supporting cable, the first inner surface and the first outer surface are arranged in sliding abutment with each other along a longitudinal direction of the self-supporting cable. In this manner the inner and outer portions of the self-supporting cable may move in relation to each other in portions of the cable, which portions are not subjected to any substantial radial load.

According to embodiments, in a region of the self-supporting cable subjected to a radially inwardly directed forces, the first inner surface and the first outer surface are arranged in frictional engagement with each other for transfer of a force along a longitudinal direction of the self-supporting cable from the outer portion to the inner portion. In this manner the force along the longitudinal direction of the self-supporting cable may be borne by the inner portion of the self-supporting cable.

According to embodiments, the inner portion may comprise a first inner portion and a second inner portion. The first inner portion may comprise the first outer surface and the second inner portion may comprise the at least one insulated conductor. In this manner the first inner portion may be chosen and/or designed to provide the coefficient of friction whereas the second inner portion may be chosen and/or designed to provide sufficient insulating properties.

According to embodiments, the first inner portion may comprise a shield band. In this manner the first outer surface may be provided on a component which has a further function in the self-supporting cable. The shield band may at least partially block an electric field. The shield band may be made of a metal, and/or comprise longitudinally extending metal wire or tape. Thus, the first outer surface and the first inner surface are both comprising metal for a metal-to-metal sliding contact without load and a metal-to-metal engaging contact with radial load.

Further features of and advantages with embodiments herein will become apparent when studying the appended claims and the following detailed description. Those skilled in the art will realize that different features of embodiments may be combined to create embodiments other than those described in the following, without departing from the scope as defined by the appended claims.

BRIEF DESCRIPTION OF THE DRAWINGS

The various aspects, including particular features and advantages, will be readily understood from the following detailed description and the accompanying drawings, in which.

DETAILED DESCRIPTION

Embodiments will now be described more fully with reference to the accompanying drawings, in which example embodiments are shown. Disclosed features of embodiments may be combined as readily understood by one of ordinary skill in the art. Like numbers refer to like elements throughout. Well-known functions or constructions will not necessarily be described in detail for brevity and/or clarity.

Figure 1:
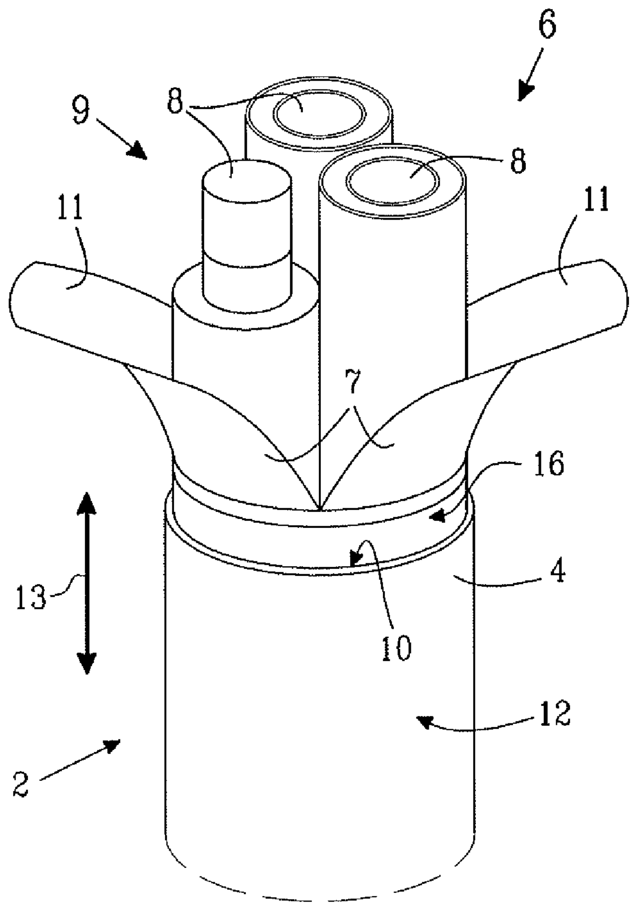
FIG. 1 shows a self-supporting cable according to embodiments.

FIG. 1 shows a self-supporting cable 2 according to embodiments. An end part of the cable 2 is shown in a partially opened condition for illustration purposes. The cable 2 comprises an outer portion 4 and an inner portion 6, one advantage being increased cable bendability. The outer portion 4 encloses the inner portion 6.

The inner portion 6 comprises at least one insulated conductor 8, in these embodiments three insulated conductors 8, e.g. for providing a three phased AC voltage. The inner portion 6 comprises a first outer surface 16. The inner portion 6 comprises a first inner portion 7 and a second inner portion 9. The second inner portion 9 comprises the three insulated conductors 8. The first inner portion 7 may be made from metal. For instance, the first inner portion 7 may comprise a shield band 11 made from metal enclosing the second inner portion 9. There may be three shield bands 11 extending along the longitudinal direction of the cable 2, one shield band 11 per insulated conductor 8, each shield band 11 extending essentially longitudinally along an outermost facing part of the conductor 8. The metal of the shield band 11 may for instance be copper, aluminium, mild steel, or zinc. The first inner portion 7 comprises the first outer surface 16.

The outer portion 4 comprises a first inner surface 10 on an inside of the outer portion 4 and an external surface 12. The first outer surface 16 abuts against the first inner surface 10. Advantageously, the first outer surface 16 and the first inner surface 10 not bonded to each other, but are able to engage in a sliding relationship at least longitudinally along the cable length.

The outer portion 4 comprises an outer layer and a metal tape adhered to the outer layer (both the latter are not shown in FIG. 1). The metal tape extends continuously around an inner circumference of the outer portion 4. The outer layer comprises the external surface 12 and the metal tape comprises the first inner surface 10.

A coefficient of friction between the first inner surface 10 and the first outer surface 16 may be at least 0.4. Thus, when the cable 2 is subjected to radially inwardly directed forces acting on the external surface 12 and subjected to a longitudinal force along a longitudinal direction 13 of the cable 2, the friction between the first inner and first outer surfaces 10, 16 permits the longitudinal force to be transferred between the outer and inner portions 4, 6 of the cable 2. The external surface 12 of the cable 2 is arranged to engage with a suspension arrangement such as a dead end spiral discussed in connection with FIG. 6 below. Such arrangement to engage on the cable's external surface 12 could comprise only the rubber or polymer surface either with no further engagement features, or being laid or provided with specific indications for showing where to position the suspension arrangement relative to the external surface of the cable.

The first inner surface 10 and/or the first outer surface 16 may be provided with holes or protrusions, e.g. the shield band 11 may be corrugated along the longitudinal direction 13.

Figure 2:
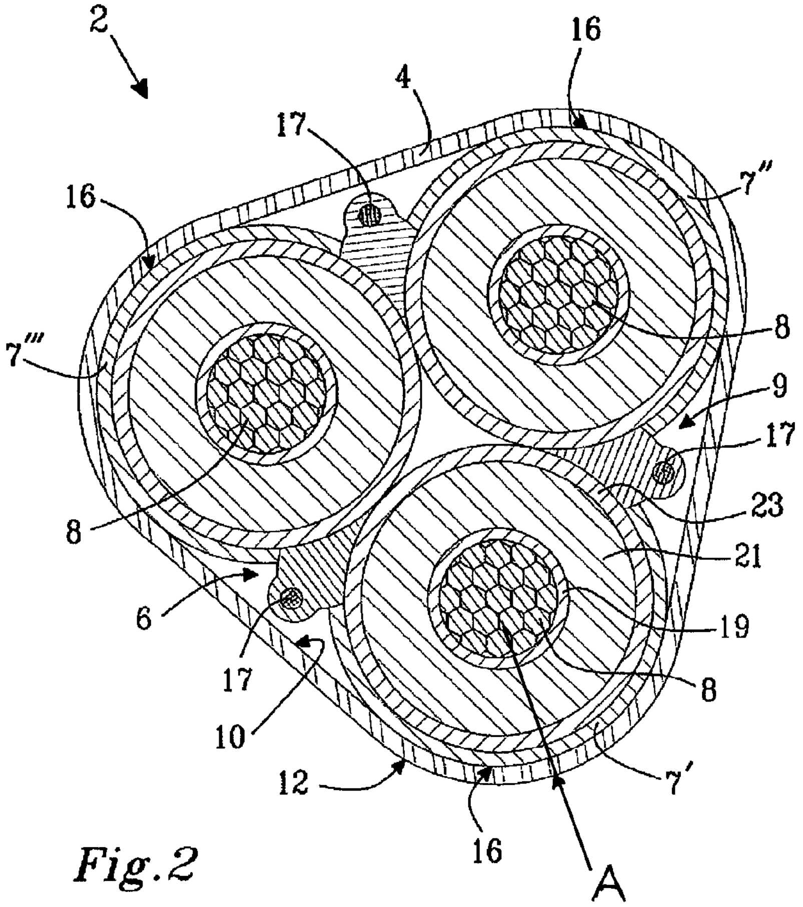
FIG. 2 illustrates a cross section through a self-supporting cable according to embodiments.

FIG. 2 illustrates a cross section through a self-supporting cable 2 according to embodiments. The cable 2 comprises an outer portion 4 and an inner portion 6 as well. The outer portion 4 encloses the inner portion 6. Again, the inner portion 6 comprises three insulated conductors 8. Again, the outer portion 4 comprises an outer layer and a metal tape adhered to the outer layer and extending continuously around an inner circumference of the outer portion 4. The outer layer comprises an external surface 12 and the metal tape comprises a first inner surface 10.

The inner portion 6 comprises a first inner portion comprising three separate first inner portions 7', 7'', 7'',' and a second inner portion 9. The second inner portion 9 comprises the three insulated conductors 8. The first inner portion comprises a first outer surface 16 extending partially over each of the three separate first inner portions 7', 7'', 7'''. The first outer surface 16 abuts against the first inner surface 10 in portions of the first inner surface 10. The first inner portion is made from metal, i.e. each one of the three separate first inner portions 7', 7'', 7''' comprises a metal tape or a metal foil. The metal may for instance be copper, aluminium, mild steel, or zinc. Together with shield wires 17, the separate first inner portions 7', 7'', 7''' form a shield for blocking electric fields. Again, a coefficient of friction between the first inner surface 10 and the first outer surface 16 may be at least 0.4.

The conductors 8 each comprise a number of metal wires. Around each of the conductors 8 there are arranged insulating layers and semi-conducting layers. Abutting against a conductor 8 is an inner semi-conducting layer 19 followed by an insulating layer 21 and an outer semi-conducting layer 23 closest to the separate first inner portions 7', 7'', 7'''

Figure 3A:
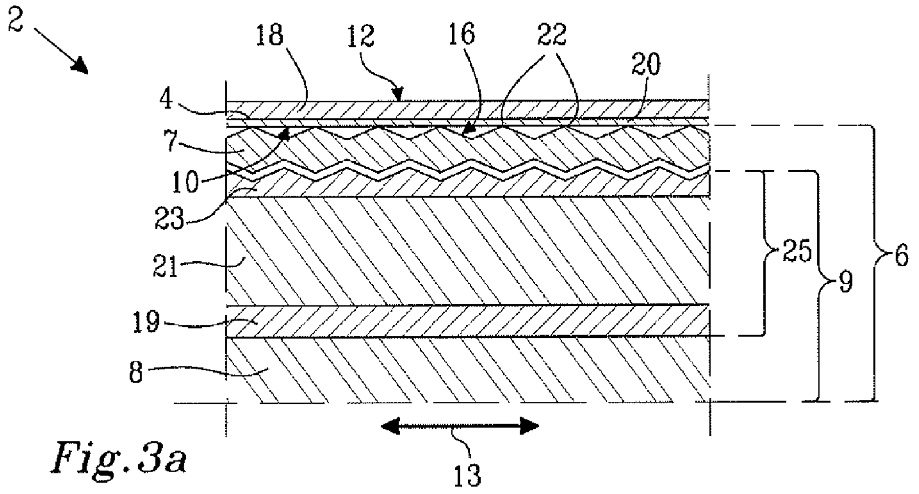
FIGS. 3*a*-3*c* illustrate partial cross sections through different embodiments of self-supporting cables.
Figure 3B:
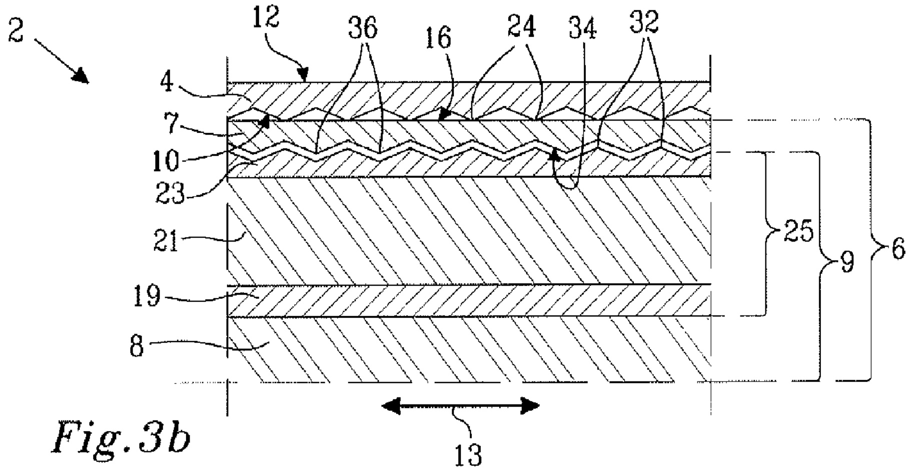
Figure 3C:
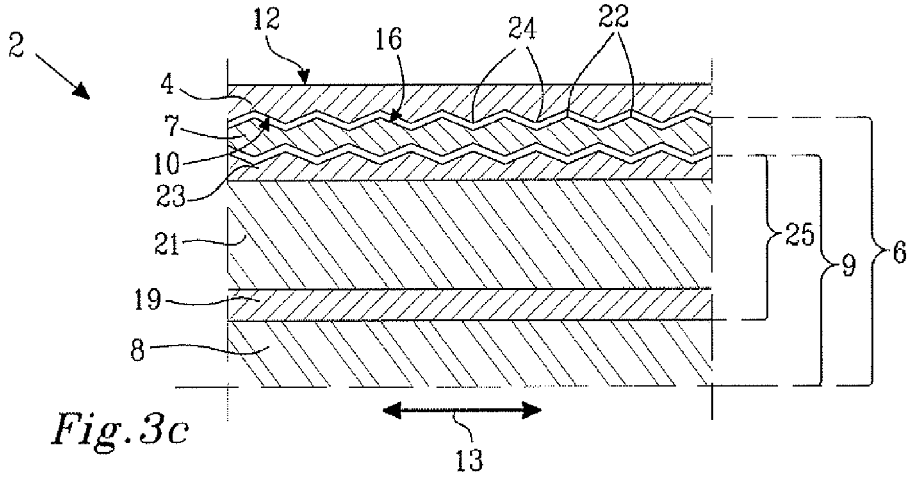

FIGS. 3*a*-3*c* illustrate partial cross sections through different embodiments of self-supporting cables 2. The cross sections are taken along a longitudinal direction 13 of the respective cables 2. The partial cross sections do not extend radially through the entire cable but instead show a cut section, which could be cut along the line A in FIG. 2. The cables 2 of each embodiment comprise an outer portion 4 and an inner portion 6. The inner portion 6 and the outer portion 4 may comprise one or several layers of different types, plastic isolating layer, metal shield, semi conductive shield, etc. The outer portion 4 comprises at least an outer layer 18 and a metal tape 20 (only illustrated in FIG. 3*a*) which metal tape 20 is adhered to the outer layer 18 and extends continuously around an inner circumference of the outer portion 4. The outer layer 18 may comprise a black polyethylene. The outer layer 18 comprises an external surface 12 and the metal tape 20 comprises a first inner surface 10.

The inner portion 6 comprises a first inner portion 7 and a second inner portion 9.

The first inner portion 7 comprises a first outer surface 16. The first outer surface 16 abuts against the first inner surface 10. Again, a coefficient of friction between the first inner surface 10 and the first outer surface 16 is at least 0.4. Suitably, the first inner portion 7 may be made from metal. Thus, for instance the first inner portion 7 comprises a weave, a braid, or a metal tape with protrusions and/or apertures. The protrusions and/or apertures may be provided in a pattern or structure such as a corrugated structure or a honeycomb structure. The metal may for instance be copper, aluminium, mild steel, or zinc.

The second inner portion 9 comprises a conductor 8 and arranged there around a shell 25. The conductor 8 may comprise a plurality of metal wires e.g. made from aluminium and/or copper. The shell 25 comprises an inner semi-conducting layer 19, an insulating layer 21, and an outer semi-conducting layer 23. The inner and outer semi-conducting layers 19, 23 may comprise extruded polyethylene layers. The insulating layer 21 may comprise an extruded layer of cross-linked polyethylene, PEX or XLPE. The cable 2 may comprise one or more second portions 9 arranged within the first inner portion 7.

In these embodiments the first inner surface 10 and/or the first outer surface 16 are provided with first and/or second protrusions 22, 24, as will be elaborated below.

The second inner portion 9 comprises the shell 25 around at least one conductor 8, the shell 25 comprising a second outer surface 30. The second outer surface 30 is provided with third protrusions 32 and the first inner portion 7 comprises a second inner surface 34. The second outer surface 30 abuts against the second inner surface 34. (The reference numbers are mainly illustrated in FIG. 3*b*.)

The second inner surface 34 may be provided with fourth protrusions 36 mating with the third protrusions 32. The inner portion 6 may comprise one or more further portions between the first inner portion 7 and the second inner portion 9 to increase the bending properties of the cable 2.

FIG. 3*a* illustrates embodiments of the self-supporting cable 2, in which the first outer surface 16 is provided with first protrusions 22. Furthermore, the first inner surface 10 is substantially smooth.

FIG. 3*b* illustrates embodiments of the self-supporting cable 2, in which the first outer surface 16, is substantially smooth. Furthermore, the first inner surface 10 is provided with second protrusions 24.

FIG. 3*c* illustrates embodiments of the self-supporting cable 2, in which the first outer surface 16 is provided with first protrusions 22. Furthermore, the first inner surface 10 is provided with second protrusions 24.

Figure 4:
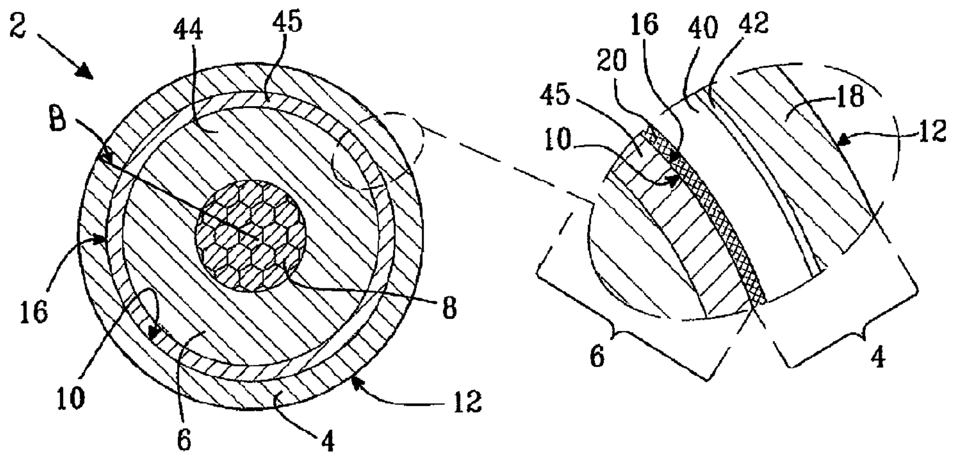
FIG. 4 illustrates a cross section through a shelf-supporting cable according to embodiments and an enlarged portion of the cross section.

FIG. 4 illustrates a cross section through a shelf-supporting cable 2 according to embodiments, and an enlarged portion of the cross section. The cable 2 comprises an outer portion 4 and an inner portion 6. The outer portion 4 encloses the inner portion 6. The inner portion 6 comprises an insulated conductor 8. The outer portion 4 comprises a first inner surface 10 on an inside of the outer portion 4 and an external surface 12. The inner portion 6 comprises a first outer surface 16. The first outer surface 16 abuts against the first inner surface 10.

The outer portion 4 comprises an outer layer 18 and a metal tape 20 adhered to the outer layer 18. The outer layer 18 may comprise a polymer such as e.g. a polyethene. The metal tape 20 is adhered to the outer layer 18 via a polymer layer 40, such as a polyester layer, and a bonding layer 42. The polymer layer 40 may further be provided longitudinally extending metal wires (not shown) to increase the self-suspending property of the cable 2, further these may act as to increase the deformation effect from a suspension arrangement around the cable 2, as well as the electrical shielding effect. The bonding layer 42 may comprise a glue or other joining agent, such as polyethene with a lower melting point than the polymer of the outer layer 18 such that the bonding layer 42 will melt and join with the outer layer 18 during extrusion of the outer layer 18. The metal tape 20 extends continuously around an inner circumference of the outer portion 4. The outer layer 18 comprises the external surface 12 and the metal tape 20 comprises the first inner surface 10. The metal tape 20, polymer layer 40, and the bonding layer 42 can each have layer thicknesses from around 5μ to around 50μ.

Alternatively, one may use a thinner metal tape, from around 5μ to around 0.1μ, but in that case it is an advantage to provide the metal tape 20 bonded to the polymer layer, and it may also be advantageous to increase the thickness of the polymer layer from around 50μ to around 200μ.

As a further alternative to the embodiment shown in FIG. 4, the thickness of the metal layer can be increased, thus eliminating the need for a polymer layer 40, to a thickness in the order of from around 50μ to around 500μ. If using such increased metal tape thickness, one may advantageously also provide the metal tape with protrusions or holes, because the deformation tendency decreases with increased metal layer thickness.

Around the conductor 8, the inner portion 6 comprises an insulation layer 44 and a semiconducting layer 45 of either thermoplastic, rubber, or thermoplastic elastomer (TPE) type, with high friction against metal. The semiconducting layer 45 comprises the first outer surface 16. A coefficient of friction between the first inner surface 10 and the first outer surface 16 is at least 0.4. Thus, when the cable 2 is subjected to a radial force acting on the external surface 12 and subjected to a longitudinal force along a longitudinal direction of the cable 2, the friction between the first inner and first outer surfaces 10, 16 permits a longitudinal force to be transferred between the outer and inner portions 4, 6 of the cable 2. The external surface 12 of the cable 2 is arranged to engage with a suspension arrangement such as a wire e.g. in the form of a spiral discussed in connection with FIG. 6 below.

FIGS. 5*a*-5*d* illustrate partial cross sections through different embodiments of self-supporting cables 2. The cross sections are taken along a longitudinal direction 13 of the respective cables 2. The partial cross sections do not extend radially through the entire cable but instead show a cut section, which could be cut along the line A in FIG. 2 or alternatively along the line B in FIG. 4. The cables 2 of each embodiment comprise an outer portion 4 and an inner portion 6. The outer portion 4 comprises an outer layer 18 (only illustrated in FIG. 5*a*) and a metal tape 20 (only illustrated in FIGS. 5*a* and 5*d*) adhered to the outer layer 18 and extending continuously around an inner circumference of the outer portion 4. The outer layer 18 may comprise a black polyethylene. The outer layer 18 comprises an external surface 12 and the metal tape 20 comprises a first inner surface 10.

The inner portion 6 comprises a first outer surface 16. In the inner portion 6 an insulation layer 44 is arranged around a conductor 8. The insulation layer 44 may comprise either thermoplastic, rubber or thermoplastic elastomer (TPE) type, with high friction against metal. The first outer surface 16 abuts against the first inner surface 10. Accordingly, the inner portion 6 comprises an insulation layer 44 around at least one conductor 8, and the insulation layer 44 comprises the first outer surface 16. Again, a coefficient of friction between the first inner surface 10 and the first outer surface 16 may be at least 0.4.

In some of these embodiments the first inner surface 10 and/or the first outer surface 16 are provided with first and/or second protrusions 22, 24, as will be elaborated below. The first outer surface 16 being provided with first protrusions 22 may improve the bending properties of the cable 2, compared to a cable 2 comprising a smooth first outer surface 16. In supplement or as alternative embodiments, the first inner surface 10 and/or the first outer surface are provided with a pattern of holes, bubbles, embossments, as well and/or any combination hereof. Other such patterned grip-improving metal workings are known to the skilled person. The dimensions of such protrusions 22, 24, holes, bubbles, embossments and/or combinations thereof are for example having pitches and/or internal maximum diameters between and in each such working are in embodiments around 0.01 mm to around 1.0 mm, preferably around 0.05 mm to around 0.4 mm, most preferably around 0.1 mm to around 0.2 mm, e.g. for a metal tape as mentioned above having a thickness in around the order of from around 5 μ to around 50 μ.

Figure 5A:
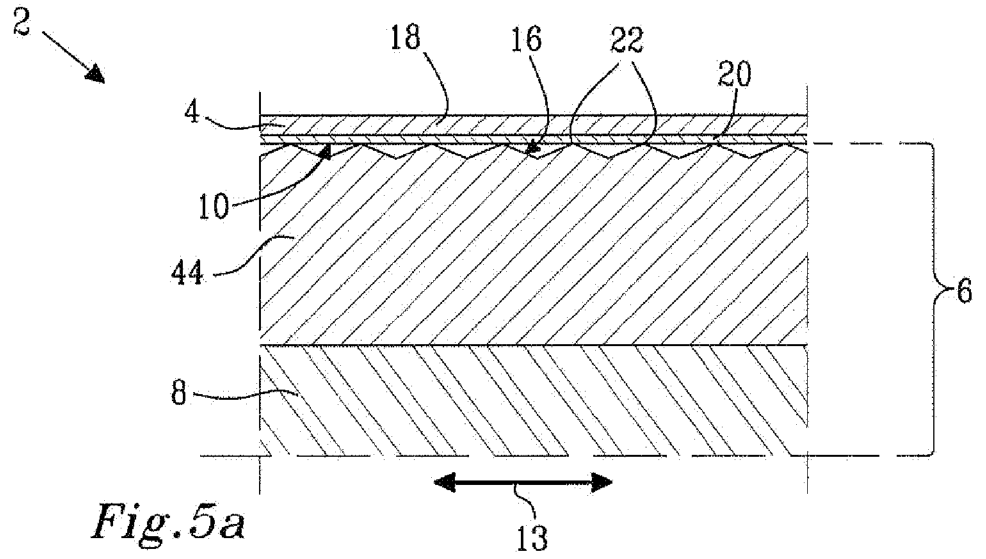
FIGS. 5*a*-5*d* illustrate partial cross sections through different embodiments of self-supporting cables.

FIG. 5*a* illustrates embodiments of the self-supporting cable 2, in which the first outer surface 16 is provided with first protrusions 22. The first inner surface 10 is substantially smooth. In these embodiments the insulation layer 44 comprises the first outer surface 16.

Figure 5B:
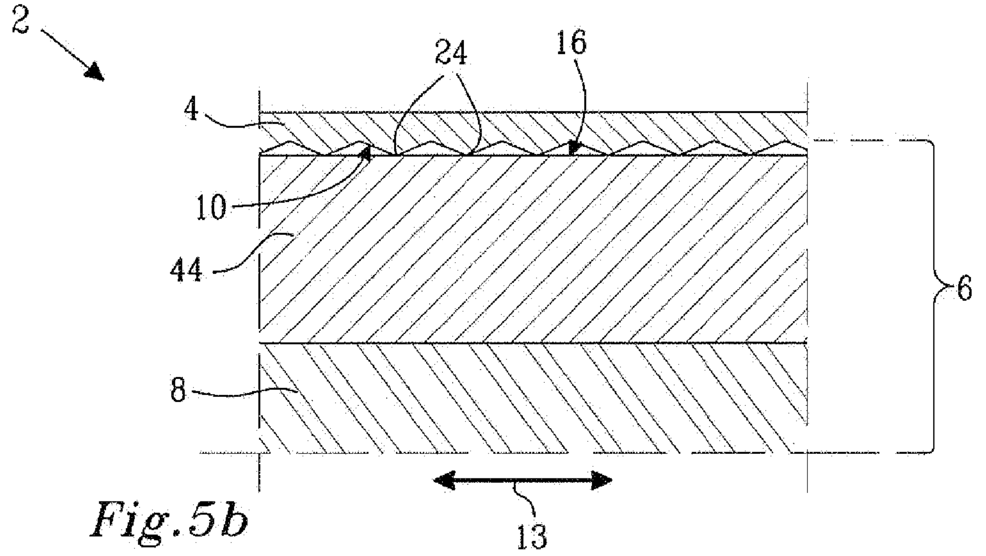

FIG. 5*b* illustrates embodiments of the self-supporting cable 2, in which the first outer surface 16 is substantially smooth. The first inner surface 10 is provided with second protrusions 24. In these embodiments the insulation layer 44 comprises the first outer surface 16.

Figure 5C:
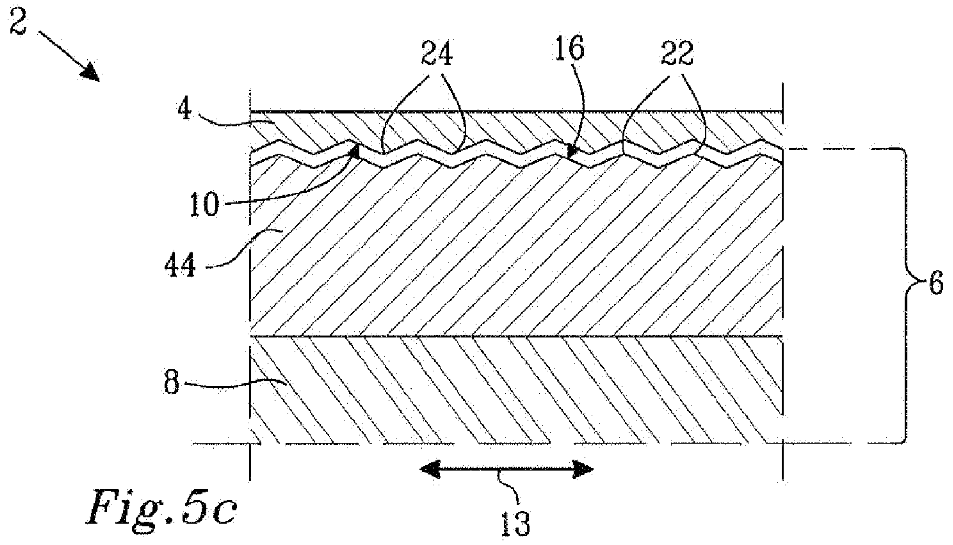

FIG. 5*c* illustrates embodiments of the self-supporting cable 2, in which the first outer surface 16 is provided with first protrusions 22. The first inner surface 10 is provided with second protrusions 24. In these embodiments the insulation layer 44 comprises the first outer surface 16.

Figure 5D:
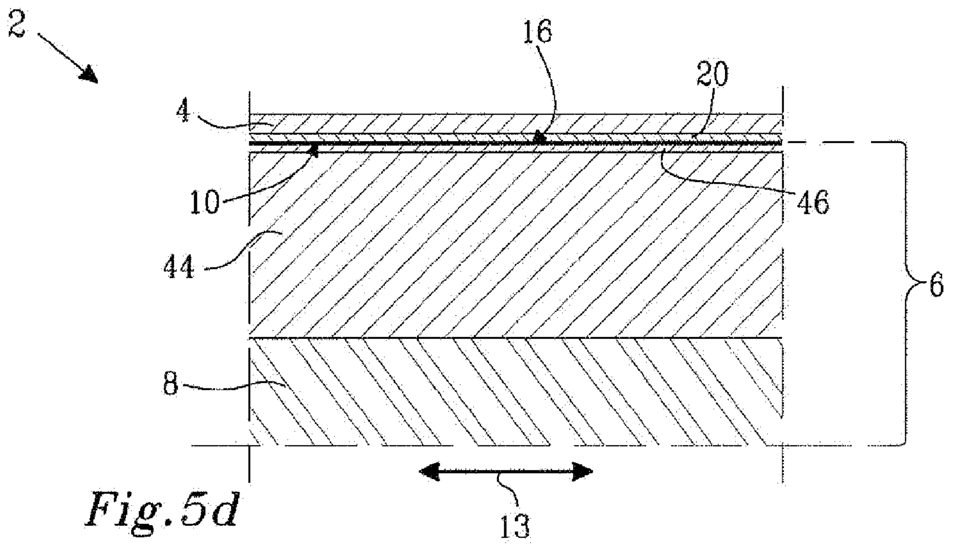

FIG. 5*d* illustrates embodiments of the self-supporting cable 2, in which the first outer surface 16 is substantially smooth and the first inner surface 10 is substantially smooth. In these embodiments, the inner portion comprises the insulation layer 44 around at least one conductor 8, and a metal layer 46 is adhered to an outside of the insulation layer 44. The metal layer 46 comprises the first outer surface 16. For instance, the metal tape 20 may be made from aluminium and the metal layer 46 may be made from aluminium. Thus, a coefficient of friction of at least 0.4 may be achieved. Since the metal layer 46 comprises the first outer surface 16 in these embodiments, the insulation layer 44 may comprise a different insulating material than a rubber-like material, e.g. a cross-linked polyethylene (XLPE), PE, PP, or PVC. Alternatively, instead of one insulation layer 44 there may be provided a system of three layers as illustrated in connection with the second inner portion 9 in FIGS. 3*a*-3*c*.

Figure 6:
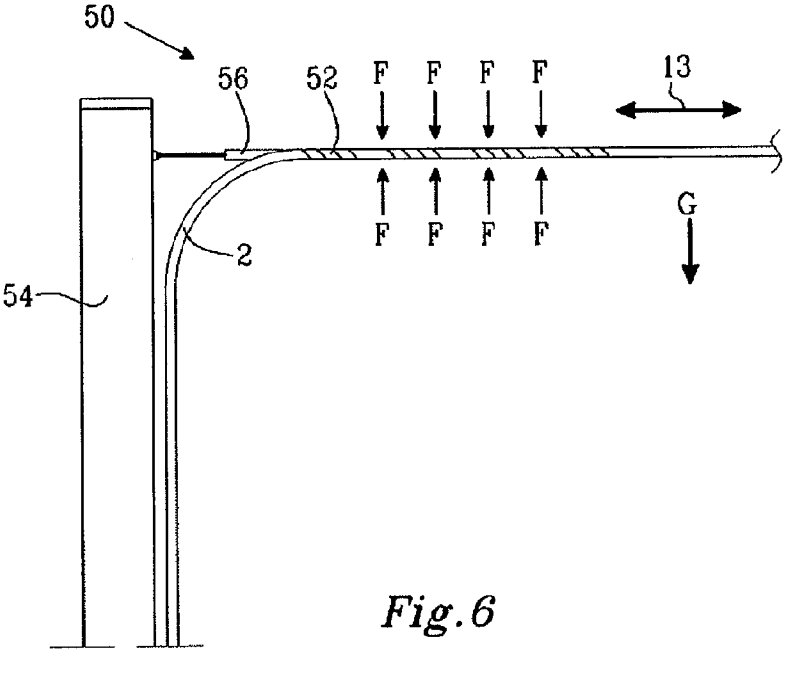
FIG. 6 illustrates a combination comprising a suspension arrangement and a self-supporting cable according to embodiments, said suspension arrangement arranged for suspending a self-supporting cable disclosed herein at a suspension point.

FIG. 6 illustrates an embodiment of a combination according to the invention of a suspension arrangement 50 and a self-supporting cable 2 according to embodiments disclosed herein at a suspension point. The suspension arrangement 50 comprises a so called dead end spiral, or simply called spiral. The suspension arrangement 50 is arranged for attaching the cable 2 to e.g. a pole 54 at a suspension end of the cable 2. The suspension arrangement 50 comprises one or more metal wires 52 twisted around the cable 2 in a spiral. One end 56 of the wire 52 is fixed to the pole 54.

At each of the two suspension ends of the cable 2 the cable 2 may be subjected to the largest force, which force has to be transferred from the cable 2 via the suspension arrangement 50 to the pole 54. Depending on the type of self-suspending cable, the cable 2 may be designed to withstand e.g. a 100 kN force along the cable 2. The force along the cable 2 comprises the gravity force G of the cable 2 itself. However, higher forces in the region of the above mentioned force figure occur when the cable 2 is subjected to loads from foreign objects, such as e.g. trees, falling over the cable 2.

In an advantageous embodiment, the combination of suspension arrangement and self-suspending cable may be dimensioned specifically to withstand heavy loads. Examples of such load forces such as may be experienced during normal operation of the combination (hanging suspended), is being subjected to a total pressure of between around 1 MPa ($N/mm^2$) to around 3 MPa in total along the suspension region of the cable. During heavy load situations, such as trees falling, wind blowing and/or snow deposition, higher loads may be experienced, e.g. summed up pressures around 5 MPa to around 6 MPa during a load period in the order of 1 to 6 days, or more. Further, in order to withstand extreme loads such as large trees falling or a pole being loosened the combination may be designed for extreme loads in the suspension region, point, or line resulting in summed up pressures of up to around 10 MPa to around 20 MPa or more over a short load period in the order of around 1 second to around 10 minutes, or even more.

The force on the cable 2 extends along a longitudinal direction 13 of the cable 2 according to embodiments disclosed herein. The twisted wires 52 engage frictionally with an external surface 12 of the cable 2. The force in the longitudinal direction 13 causes a diameter of the spiral formed by the twisted wires 52 to decrease. Thus, the suspension point, line, or region of the self-supporting cable 2 partially enclosed by the twisted wires 52 is subjected to radially inwardly directed forces F. The radially inwardly directed forces F may cause the first inner surface 10 of the outer portion 4 of the cable 2 and the first outer surface 16 of the inner portion 6 of the cable 2 on or along the suspension point, line, or region to frictionally engage with each other for transfer of the force along the longitudinal direction 13 from the outer portion 4 to the inner portion 6. The twisted wires 52 may extend up to 2-4 metres along the cable 2 in order to distribute the radially inwardly directed forces F to the cable 2. The actual length of the suspension region or line may advantageously be selected relative to the weight of the cable per meter, the cable diameter, the softness of the material selected for the outer portion 4 and metal layer.

The twisted wires 52 may be provided with a rough surface to ensure a good frictional engagement with the outer surface 12 of the cable 2. The twisted wires may be provided upon the cable 2 with a differently laid pattern than a dead end spiral, such as e.g. a helical pattern, a meandering pattern along the length of the cable or circumferentially, a stich pattern, and any combination thereof, able to provide point-wise, peripheral-wise and/or longitudinally extending line-wise deformation of the metal tape. The twisted wires may be made from different materials, such as metal, glass fiber or carbon fibre armoured polymer, or combinations thereof in order to provide a strong and durable suspension arrangement. The term wires may also include tapes or bundled filaments.

Both the self-suspending cable according to the embodiments, and the combination according to embodiments of a suspension arrangement and such cable may advantageously be used in aerial, mining, or marine applications. The marine applications may include power distribution supplying off-shore wave or wind power stations, oil/gas platforms and field pumps, as well as power transported away from wave energy installations towards shore or between installations.

The following discussion relates to the cables according to embodiments disclosed herein: As discussed initially, in the region of the cable 2 subjected to radially inwardly directed forces F, sliding between first outer surface 16 and the outer portion 4 takes place by the first inner surface 10 and thus, the metal tape 20 deforming locally. The first inner surface 10 is sheared by the first outer surface 16—however, without rupturing the metal tape 20 more than locally. A longitudinal force along the cable 2 may thus be spread out evenly along said region. Thus, a suspension arrangement 50 subjecting the cable 2 to radially inwardly directed forces F, such as a spiral, moves to a lesser extent and in a more controlled manner in relation to the outer portion 4 of the cable 2 in embodiments disclosed herein than in a prior art cable, such as the cable disclosed in U.S. Pat. No. 6,288,339. Thus, the risk of the outer portion 4 rupturing, or the spiral unwinding from the cable 2, is smaller for cables 2 according to embodiments disclosed herein than in prior art cables.

Some metals such as copper and aluminium harden when deformed. The frictional engagement between the first outer surface 16 and the first inner surface 10 may deform the first inner surface 10 when the cable 2 is subjected to a radially inwardly directed forces F and a force along the longitudinal direction 13 of the cable 2. When the metal tape 20 is made from e.g. copper or aluminium, due to the deformation hardening, the friction between the first inner and outer surfaces 10, 16 increases as the material of the metal tape 20 hardens locally were the first inner surface 10 is deformed. Eventually, no more deformation takes place in one local area. Instead, deformation may continue in a different local area. Thus, the load is spread out over the region of the outer portion 4 enclosed by the wire or spiral without the outer portion 4 rupturing. An even distribution of the force along the longitudinal direction 13 from the outer portion 4 to the inner portion 6 is achieved. The wire or spiral may transfer a larger load to a cable 2 according to embodiments disclosed herein than in prior art cables.

In the following approximate coefficients of friction, μ, for some material combinations involving the metal tape 20 comprising the first inner surface 10 and the first outer surface 16 of the inner portion 6 are presented. Thus, these are examples of suitable material combinations.

Copper—Copper—μ=0.4-1.2
Copper—Mild Steel—μ=0.5
Copper—Tinplated-Copper μ=0.4-1.1
Aluminium—Aluminium—μ=0.4-1.1
Aluminium—Mild Steel—μ=0.6
Metal—Rubber—μ=0.5-1.5

Example embodiments described above may be combined as understood by a person skilled in the art. For instance, the metal tape 20 may be adhered to the outer layer 18 as disclosed in connection with FIG. 4 in all disclosed embodiments. Although reference has been made to example embodiments, many different alterations, modifications and the like will become apparent for those skilled in the art. For instance, the metal tape 20 as such may be adhered to the outer layer 18 by means of a bonding layer. The bonding layer may comprise a glue or other joining agent, as explained in connection with FIG. 4. Other types of suspension arrangements than wires or spirals, subjecting the cable to radially inwardly directed forces, such as tension clamps, may be used at suspension point of the cable. A substantially smoothly manufactured first inner surface 10 or first outer surface 16 may under radial load be deformed in particular, when a substantially smooth surface abuts against an opposite surface being provided with protrusions. A surface produced e.g. by rolling a metal into a sheet or band provides an example of a substantially smooth surface. Accordingly, also other surfaces of similar smoothness are considered to be substantially smooth surfaces. Therefore, it is to be understood that the foregoing is illustrative of various example embodiments and that the invention is defined only the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A self-supporting cable comprising an outer portion and an inner portion, the inner portion comprising at least one insulated conductor and the outer portion comprising a first inner surface and an external surface, the external surface being arranged to engage with a suspension arrangement, wherein the inner portion comprises a first outer surface, the first outer surface abutting against the first inner surface, the outer portion comprises an outer layer and a metal tape adhered to the outer layer, wherein the outer layer comprises the external surface, and wherein the metal tape comprises the first inner surface; wherein at least in a point, line, or region of the self-supporting cable subjected to a radially inwardly directed force (F) the first inner surface and the first outer surface are arranged in frictional engagement with each other for transfer of a force along a longitudinal direction of the self-supporting cable from the outer portion to the inner portion; wherein the metal tape has a thickness that is: (i) from around 50 μm to around 500 μm, or (ii) from around 5 μm to around 50 μm and the metal tape is bonded to a polymer layer, or (iii) lower than around 5 μm and the thickness of the polymer layer is from around 50 μm to around 200 μm; and wherein a coefficient of friction between the first inner surface and the first outer surface is at least 0.4.

2. The self-supporting cable according to claim 1, wherein the metal tape is continuous.

3. The self-supporting cable according to claim 1, wherein the first inner surface and/or the first outer surface is/are provided with protrusions.

4. The self-supporting cable according to claim 3, wherein the first outer surface is provided with first protrusions.

5. The self-supporting cable according to claim 1, wherein the first outer surface is substantially smooth.

6. The self-supporting cable according to claim 1, wherein the first inner surface is substantially smooth.

7. The self-supporting cable according to claim 1, wherein the first inner surface is provided with second protrusions.

8. The self-supporting cable according to claim 1, wherein the metal tape comprises a metal selected from copper, aluminium, soft steel or zinc, or combinations thereof.

9. The self-supporting cable according to claim 1, wherein the first outer surface is provided with depressions.

10. The self-supporting cable according to claim 1, wherein in a radially unloaded region of the self-supporting cable the first inner surface and the first outer surface are arranged in sliding abutment with each other along a longitudinal direction of the self-supporting cable.

11. The self-supporting cable according to claim 1, wherein the inner portion comprises a first inner portion and a second inner portion, the first inner portion comprising the first outer surface and the second inner portion comprising the at least one insulated conductor.

12. The self-supporting cable according to claim 11, wherein the first inner portion is made from metal.

13. The self-supporting cable according to claim 11, wherein the first inner portion comprises a shield band.

14. The self-supporting cable according to claim 11, wherein the first inner portion comprises a weave, a braid, or a metal tape with protrusions or apertures.

15. The self-supporting cable according to claim 11, wherein the second inner portion comprises a shell around the at least one conductor, the shell comprising a second outer surface, the second outer surface being provided with third protrusions, and wherein the first inner portion comprises a second inner surface, the second outer surface abutting against the second inner surface.

16. The self-supporting cable according to claim 1, wherein the inner portion comprises an insulation layer around the at least one conductor, and wherein the insulation layer comprises the first outer surface.

17. The self-supporting cable according to claim 1, wherein the inner portion comprises an insulation layer around the at least one conductor, and wherein a metal layer is adhered to an outside of the insulation layer, the metal layer comprising the first outer surface.

18. A combination of a suspension arrangement and a self-supporting cable according to claim 1, said suspension arrangement comprising one or more metal wires twisted around the cable in a spiral, such that a suspension point, line, or region of the self-supporting cable being partially enclosed by the twisted wires is subjected to radially inwardly directed forces (F).

19. The combination according to claim 18, wherein said spiral is a dead end spiral.

20. The combination according to claim 18, said suspension arrangement being arranged for attaching the cable to a carrying structure at a suspension end of the cable.

21. The combination according to claim 20, where one end of the wire is fixable to the carrying structure.

22. The combination according to claim 18 the twisted wires extending up to two meters along the cable in order to distribute the radially inwardly directed forces (F) to the cable.

23. The combination according to claim 18, being arranged to, when radially inwardly directed forces (F) are present, the twisted wires, which engage frictionally with an external surface of the cable, such that the force in the longitudinal direction causes a diameter of the spiral formed by the twisted wires to decrease and the radially inwardly directed forces (F) cause the first inner surface of the outer portion of the cable and the first outer surface of the inner portion of the cable to frictionally engage with each other for transfer of the force along the longitudinal direction from the outer portion to the inner portion.

24. The combination according to claim 23, wherein the cable and the suspension arrangement at least during said specific load, cooperate to make the first inner surface and the metal tape deform locally in many places underneath the suspension arrangement, in particular directly underneath where the suspension arrangement applies at least one of said radially inwardly directed forces (F) on at least one suspension point, line, or region along the self-supporting cable, providing a static coefficient of friction of around 0.8 or higher.

25. The combination according to claim 18, wherein the twisted wires are provided with a rough surface engaging with the outer surface of the cable.

* * * * *